United States Patent
Yamauchi et al.

(10) Patent No.: US 7,047,952 B1
(45) Date of Patent: May 23, 2006

(54) CANISTER

(75) Inventors: Tokio Yamauchi, Obu (JP); Takashi Nagai, Obu (JP); Masamitsu Hayakawa, Obu (JP); Yukihiko Kaneda, Obu (JP); Yojiro Iriyama, Toyota (JP)

(73) Assignees: Aisan Kogyo Kabushiki Kaisha, Aichi-ken (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 11/257,079

(22) Filed: Oct. 25, 2005

(30) Foreign Application Priority Data

Nov. 15, 2004 (JP) .............................. 2004-330610

(51) Int. Cl.
 *F02M 33/02* (2006.01)
(52) U.S. Cl. ..................................... 123/519; 123/520
(58) Field of Classification Search ................ 123/516, 123/518, 519, 520
See application file for complete search history.

(56) References Cited

U.S. PATENT DOCUMENTS

| | | | | |
|---|---|---|---|---|
| 5,170,765 A | * | 12/1992 | Hoshino et al. ............. | 123/520 |
| 5,207,808 A | * | 5/1993 | Haruta et al. ................. | 96/131 |
| 5,355,861 A | * | 10/1994 | Arai ........................... | 123/519 |
| 5,599,384 A | * | 2/1997 | Yoshida et al. ............... | 96/143 |
| 5,632,251 A | * | 5/1997 | Ishikawa ..................... | 123/519 |
| 5,632,252 A | | 5/1997 | Hyodo et al. | |
| 5,861,050 A | * | 1/1999 | Pittel et al. ................... | 95/115 |
| 5,878,729 A | * | 3/1999 | Covert et al. ................ | 123/520 |
| 5,912,368 A | * | 6/1999 | Satarino et al. ............... | 55/320 |
| 6,047,687 A | * | 4/2000 | Ishikawa et al. ............. | 123/518 |
| 6,279,548 B1 | * | 8/2001 | Reddy ......................... | 123/520 |
| 6,689,196 B1 | * | 2/2004 | Amano et al. ................ | 96/112 |
| 2002/0020398 A1 | * | 2/2002 | Kimoto et al. .............. | 123/519 |

FOREIGN PATENT DOCUMENTS

| | | |
|---|---|---|
| JP | 8218922 | 8/1996 |
| JP | 9112357 | 4/1997 |
| JP | 2002147297 | 5/2002 |
| JP | 2003172213 | 6/2003 |

* cited by examiner

*Primary Examiner*—Thomas Moulis
(74) *Attorney, Agent, or Firm*—Stevens, Davis, Miller & Mosher, LLP (57) ABSTRACT

A canister comprises a tank port communicated with an upper air chamber in a closed fuel tank, a purge port communicated with an intake passage of an engine, an atmospheric port opened to the atmosphere, and a main adsorbent chamber containing activated carbon, and the canister is further provided with a partition plate between the tank port and the purge port for preventing both ports from being directly communicated with each other, so as to form a first chamber between the main adsorbent chamber and the tank port, and a second chamber between the main adsorbent chamber and the purge port, and a purge buffer plate is further provided in the main adsorbent chamber between the tank port and the purge port, for communicating between the first and second chambers with each other, the first chamber serves as an air chamber containing no activated carbon while the second chamber contains activated carbon. With this configuration, the canister has no external pipe line, the time change in fuel concentration of purged gas during treatment of evaporated fuel from the fuel tank is moderated in order to restrain an engine air-fuel ratio from being abruptly changed, and the operation ability of the engine can be satisfied.

14 Claims, 14 Drawing Sheets

CANISTER

BACKGROUND OF THE INVENTION

The present invention relates to a canister used in an evaporated fuel treating equipment for an internal combustion engine.

RELATED ART

Figure 1:
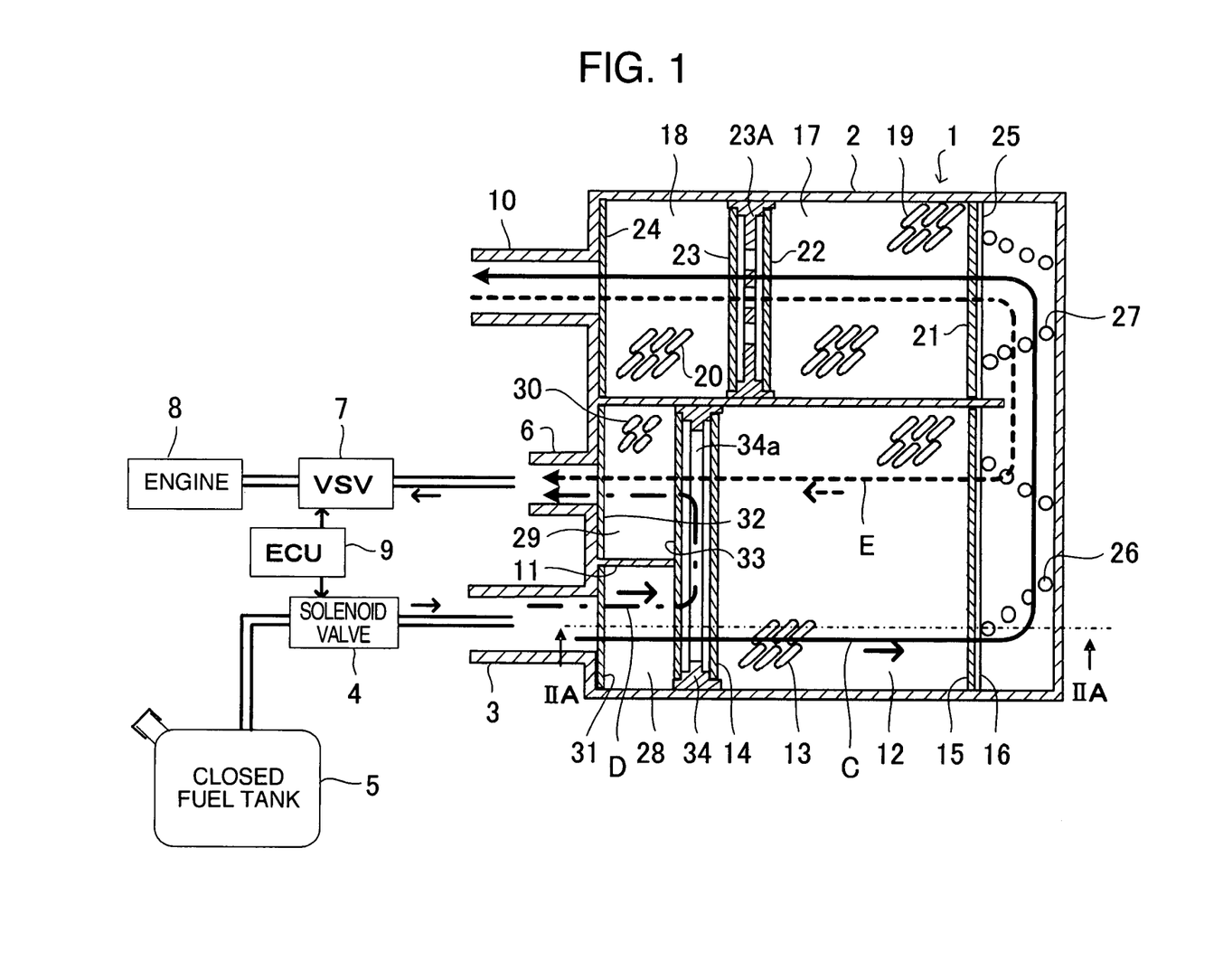
FIG. 1 is a view illustrating an overall configuration of an evaporated fuel treating equipment in an embodiment 1 according to the present invention, in which a canister is shown in a vertical section view.
Figure 2A:
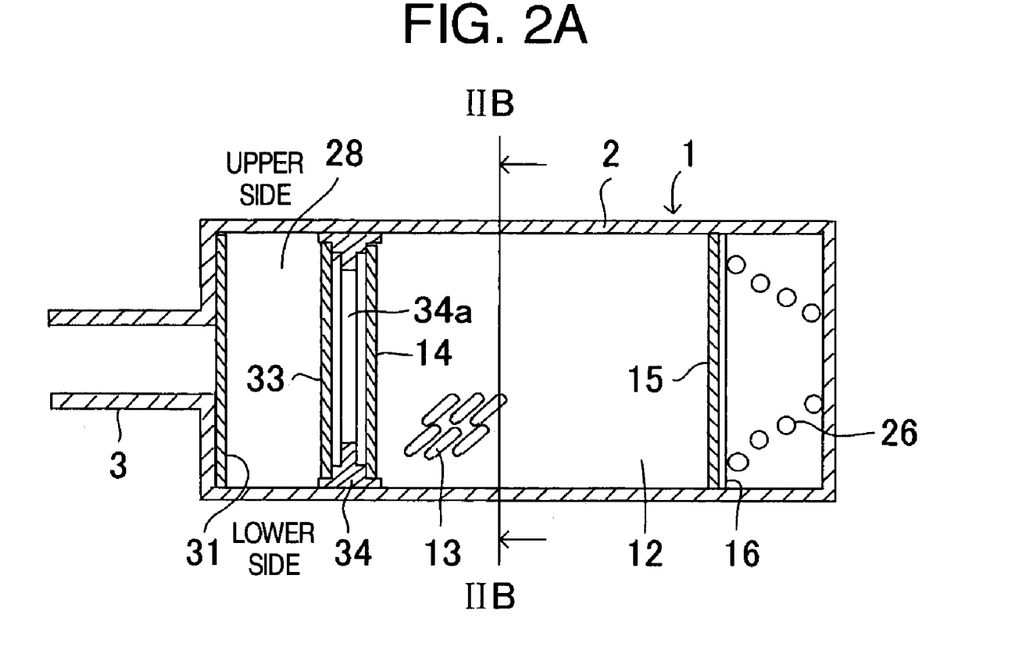
FIG. 2A is a sectional view along line IIA—IIA in FIG. 1.
Figure 3:
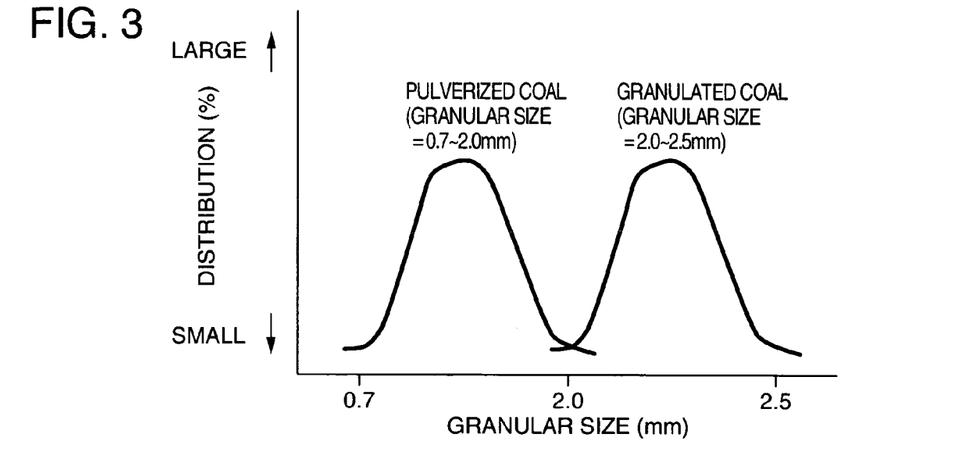
FIG. 3 is a view for explaining a grain size distribution of pulverized coal and granulated coal.

There has been well-known such an evaporated fuel treating equipment for an internal combustion engine, comprising a first canister and a second canister for adsorbing evaporated fuel generated from a fuel tank, the canisters being connected in series with each other between an atmospheric port of the first canister and an intake passage of an internal combustion chamber so as to cause air flowing from the atmospheric port to flow through the first canister and the second canister, successively, in order to purge evaporated fuel adsorbed in these canisters, the evaporated fuel and the air being then fed into the intake passage, a first evaporated fuel passage for guiding evaporated fuel generated from the fuel tank during fueling the fuel tank, and a second evaporated fuel passage for guiding evaporated fuel generated from the fuel tank during operation of the engine, directly into an evaporated fuel adsorbent within the second canister so that an adsorbing condition of the evaporated fuel adsorbent in the second canister in the vicinity of a passage through which the evaporated fuel and the air are fed from the second canister into the intake passage is substantially constant from a last purge completion time to a next purge start time (Refer to FIGS. 1 to 3 in JP-A-8-218922).

Further, there has been also well-known an evaporated fuel processing treating equipment incorporated therein with an adsorbent cartridge composed of a plurality of segments of evaporated fuel adsorbent which are wrapped with a filter member (Refer to page 2 and FIG. 1 in JP-A-2002-147297).

The evaporated fuel treating equipment disclosed in JP-A-8-218922 has a complicated configuration and many parts since it requires not only two canisters, that is, the first canister and the second canister, but also a separate pipe line as the second evaporated fuel passage, and accordingly, it is expensive in costs and as well causes a difficulty in installation thereof in a vehicle. Further, there has been a problem caused a risk of leakage of evaporated fuel to the atmosphere due to break-away of a pipe line.

The evaporated fuel treating equipment disclosed in the JP-A-2002-147297 incorporates a plural kinds of activated carbon which can hardly be distinguished from one another, and has caused a problem of erroneous intermingling of activated carbon.

BRIEF SUMMARY OF THE INVENTION

Thus, an object of the present invention is to provide a canister in an evaporated fuel treating equipment for an internal combustion engine, which can solve the above-mentioned problems inherent to the prior art.

The essential feature of the present invention is the provision of a buffering activated carbon chamber which is located adjacent to a purge port of a canister in order to add a flow of purged gas from a space chamber adjacent to a tank port into an intake passage of an engine by way of the buffering activated carbon chamber during operation of the engine.

According to a first aspect of the present invention, there is provided a canister comprising a tank port communicated with an upper gas chamber of a fuel tank, a purge port communicated with an intake passage of an engine, an atmospheric port opened to the atmosphere and a main adsorbent chamber containing activated carbon for adsorbing evaporated fuel flowing from the tank port to the atmospheric port, wherein a partition plate is provided between the tank port and the purge port, for preventing both ports from being directly communicated with each other, so as to form a first chamber between the main adsorbent chamber and the tank port and a second chamber between the main adsorbent chamber and the purge port, and a purge buffer plate is provided in the main adsorbent chamber on the tank port/purge port side for communicating between the first and second chambers, the first chamber serving an air chamber without containing activated carbon, and the second chamber containing activated carbon.

According to a second aspect of the present invention, it is characterized in the canister of the first aspect that an air-flow resistance between the first chamber and the main adsorbent chamber is set to be higher than that of the purge buffer plate between the first and second chambers.

According to third and ninth aspects of the present invention, it is characterized in the canister of the first and second aspects that pulverized coal may be used as the activated carbon contained in the second chamber, and granulated coal be used as the activated carbon contained in the other adsorbent chambers.

Further, according to fourth and tenth aspects of the invention, it is characterized in the canister of the first and ninth aspects that the air-flow resistance of a filter provided in the main adsorbent chamber on the tank port/purge port side is set per unit area to be higher than that of a filter provided in the second chamber on the purge port side and of a filter provided in the second chamber on the main adsorbent chamber side.

Further, according to fifth and eleventh aspects of the invention, it is characterized in the canister of the first and tenth aspects that a adsorbent retaining plate is superposed on one side of the filter provided in the main adsorbent chamber on the tank port/purge port side, at least one constriction hole being formed in the adsorbent retaining plate, and further, the total air-flow resistance of the filter and the adsorbent retaining plate superposed with each other is set per unit area to be higher than that of the filter provided in the second chamber on the purge port side and of the filter provided in the second chamber on the main adsorbent chamber side.

Further, according to sixth and twelfth aspects of the invention, it is characterized in the canister of the first and eleventh aspects that the activated carbon contained in the second chamber is packed by a filter member wrapping it, but the activated carbon contained in the other adsorbent chamber is not packed.

Further, according to seventh and thirteenth aspects of the invention, it is characterized in the canister of the first and twelfth aspects that the volume of the second chamber containing activated carbon is set to a value in a range of $1/1,400$ to $10/1,400$ with respect to that of the capacity of the fuel tank.

Further, according to eighth and fourteenth aspects of the invention, it is characterized in the canister of the first and thirteenth aspects that the position of a vapor passage in the purge buffer plate is set to be on the upper side in the purge buffer plate in such a posture that the canister is installed in a vehicle.

In the first aspect of the present invention, since the necessity of a pipe line constituting the second evaporated fuel passage as disclosed in JP-A-8-218922 is not required, and further, since the second chamber and the main adsorbent chamber are communicated with each other within the casing of the canister, the configuration of the canister becomes simple. Evaporated gas (vapor) from a closed fuel tank of which fuel concentration greatly varies is turned into purged gas fed into the engine and gently varying its fuel concentration in time by adsorption and purge functions of the activated carbon contained in the second chamber. Thus, abrupt variation in engine air-fuel ratio is restrained, thereby it is possible to carry out satisfactory operation of the engine. Further, since the evaporated fuel gas can hardly flow through the main adsorbent chamber, thereby it is possible to restrain deterioration of the activated carbon in the main adsorbent chamber.

In the second aspect of the present invention, the evaporate gas from the fuel tank can easily flow into the second chamber having a lower air-flow resistance, thereby it is possible to further restrain deterioration of the activated carbon in the main adsorbent chamber.

Further, in the third and ninth aspects of the present invention, pulverized coal having a fine particle size is used as the activated carbon in the second chamber so as to enhance the adsorbing function while the time variation in the fuel concentration of purged gas can be further decreased, thereby it is possible to carry out more satisfactory operation of the engine. Further, granulated coal having a large particle size is used as the activated carbon in adsorbing chambers other than the second chamber, so that the air-flow resistances of these chambers become smaller. As a result, it is possible to enhance the adsorbing functions of activated carbon, for evaporated gas flowing into the canister through the tank port during fuel supply without substantially increasing the overall air-flow resistance of the canister.

Further, in the fourth, fifth, tenth and eleventh aspects of the present invention, the evaporated fuel (vapor) surely flows in the second chamber so as to be restrained from being adsorbed to the activated carbon in the main adsorbent chamber for fuel supply during running of a vehicle. Further, although air including a large quantity of fuel vapor, which is generated when supplying fuel, flows into the tank port, the air is smoothly discharged from the atmospheric port with no substantial affection by a pressure loss through the filter since the inflow pressure thereof is high. Thus, no automatic stop of fuel supply is caused up to a predetermined quantity of fuel.

Further, in the sixth aspect of the invention, the activated carbon contained in the second chamber is packed so as to be easily inserted inward of the chamber during assembly, thereby it is possible to enhance the assembling ability. Further, it is possible to prevent the activated carbon to be contained in the main adsorbent chamber or the like from being erroneously contained in the second chamber or being mingled with another kind of activated carbon. This configuration is effective in such a case that the activated carbon in the second chamber is different in kind from that in the main adsorbent chamber or the like.

Further, in the seventh and thirteenth aspects of the present invention, the quantity of activated carbon in the second chamber can be optimized thereby it is possible to materialize a canister which is inexpensive and which can be easily installed in a vehicle. Should the quantity of activated carbon in the second chamber be less, the function making the variation of the fuel concentration of the purged gas fed into the engine gentle in time would become insufficient, but should it be larger, the canister has to have a large size and become expensive, and the installation in the vehicle is uneasy.

Further, in the eighth and fourteenth aspects of the present invention, evaporated fuel gas which is heavier than the air can hardly flow into the main adsorbent chamber, but can easily flow into the second chamber, thereby it is possible to restrain the so-called blow-off of evaporated fuel gas from the canister. Thus, it is possible to further restrain the activated carbon in the main adsorbent layer from deteriorating.

BRIEF DESCRIPTION OF THE DRAWINGS

FIGS. 10A to 10D are views illustrating a purge buffer plate in the canister shown in FIG. 9, among which

FIGS. 16A to 16B are view illustrating a subassembly of a purge buffer plate, and three filters and a adsorbent retaining plate in the canister shown in FIG. 15, among which

DETAILED EXPLANATION OF PREFERRED EMBODIMENT OF THE INVENTION

Embodiment 1

Figure 2B:
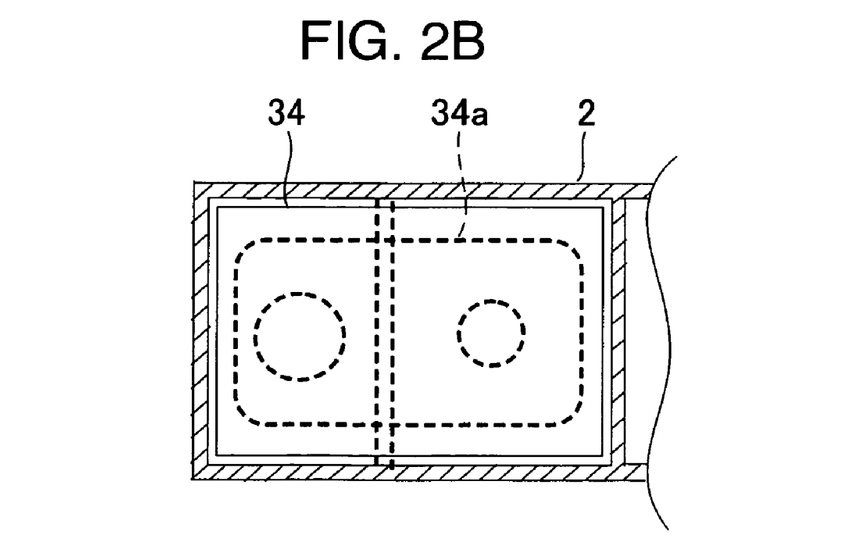
FIG. 2B is a sectional view along line IIB—IIB in FIG. 2A.

Referring to FIGS. 1, 2A and 2B which shows an embodiment 1 according to the present invention, in which FIG. 1 is a schematic view illustrating an overall configuration of an evaporated fuel treating equipment in the embodiment 1, in which a canister is shown in a vertical section view, FIG. 2A is a sectional view along line IIA-IIB in FIG. 1, and FIG. 2B is a sectional view line IIB—IIB in FIG. 2A.

The canister 1 has a casing 2 with a tank port 3, which is communicated with an upper air chamber in a closed fuel tank 5 through the intermediary of a solenoid valve 4. The casing 2 also is provided with a purge port 6, which is connected to an intake passage of an engine 8 through the intermediary of a purge control valve (VSV) 7. An electronic control unit (ECU) 9 controls the solenoid valve 4 and the purge control valve 7. There is also shown an atmospheric port (atmospheric hole) 10.

Between the tank port 3 and the purge port 6, a partition plate 11 for preventing both ports from being directly communicated with each other is integrally incorporated with the casing 2. Further, there are shown a main adsorbent chamber 12 filled therein with activated carbon 13 serving as adsorbent, adsorbent retaining filters 14, 15, and an adsorbing retaining plate 16. Further, there are first and second subchambers 17, 18 filled therein with activated carbon 19, 20, respectively, adsorbent retaining filters 21, 22, 23 and 24, an adsorbing retaining plate 25, and springs 26, 27 for urging the plates 16, 25 against the filters 15, 21. An atmospheric buffer plate 23A for partitioning between the first subchamber 17 and the second subchamber 18 is provided between the filters 22, 23. Since both subchambers 17, 18 are partitioned from each other, the diffusion of vapor can be prevented.

Further, there are shown a first chamber 28 formed between the main adsorbent chamber 12 and the tank port 3 and serving as an air chamber with no activated carbon being contained therein, a second chamber 29 formed between the main adsorbent chamber 12 and the purge port 6, and filled therein activated carbon 30 as adsorbent, fitters 31, 32, 33, and a purge buffer plate 34. The purge buffer plate is located between the filters 14, 33, and secured to the casing 2, and comprises a passage 34a for communicating between the first chamber 28 and the second chamber 29 through the intermediary of the filter 33.

During fueling the fuel tank 5, the solenoid valve 4 is opened, and accordingly, evaporated gas from the tank 5 flows through the tank port 3 as indicated by the arrow C in FIG. 1, and flows through the filter 31, the first chamber 28, the filter 33, the buffer plate 34 and the filter 14 and into the main adsorbent chamber 12 where it is adsorbed to the activated carbon 13 serving as adsorbent. The remaining air flows through the first subchamber 17 and the second subchamber 18, and is then discharged into the atmosphere from the atmospheric port 10. At this time, the evaporated gas which has not yet been adsorbed to the activated carbon 13 is adsorbed to the activated carbon 19, 20 and the like.

Evaporated gas during running of the vehicle or at a high pressure in the fuel tank, flows as indicated by the arrow D. That is, the evaporated gas flows from the first chamber 28, through the intermediary of the filter 33, the passage 34a in the buffer plate 34 and the filter 33, into the second chamber 29, and further passes through the filter 32, and flows through the intermediary of the purge port 6 and the purge control valve (VSV) 7, and then, is fed into an intake passage of the engine 8. The purge control valve 7 is duty-controlled by the ECU 9. Further, as to the flow of evaporated fuel during the so-called purge, evaporated gas which has been adsorbed to activated carbon 20, 29, 13, is purged (removed) by the stream of air flowing into the canister from the atmospheric port as indicated by the arrow E, and is fed into the intake passage of the engine 8.

Evaporated gas having a large variation in fuel concentration (time variation in fuel concentration), which is introduced into the tank port 3 from the closed fuel tank 5 through the opened solenoid valve 4, is changed to have the gentle time variation in fuel concentration by adsorption and purge action of the activated carbon 30 in the second chamber 29. That is, the variation in fuel concentration of the purged gas fed into the engine becomes less. Thus, abrupt variation in engine air-fuel ratio is restrained, thereby satisfactory engine operation can be carried out. The total air-flow resistance of the filter 33 between the first chamber 28 and the main adsorbent chamber 12, the buffer plate 34 and the filter 14 is set to be higher than the air-flow resistance of the purge buffer plate 34 between the first and second chambers, i.e., the total air-flow resistance of the filter 33 and the passage 34a, so as to restrain the quantity of evaporated gas flowing into the main adsorbent chamber 12 from the tank port 3, thereby it is possible to restrain the activated carbon in the main adsorbent chamber 12 from being deteriorating.

The volume of the second chamber 29 or the capacity of the purge buffer activated carbon 30 is appropriately set to about 100 mL in comparison with the capacity of the fuel tank 5 which is 70 L, but should be set to not less than 50 mL which is a half thereof, as a minimum necessary capacity corresponding to $\frac{1}{1,400}$ of the fuel tank capacity which is 70 L in order to obtain a sufficient blunting effect. The larger the volume (capacity) of the second chamber 29, the higher the blunting effect, but the size of the canister becomes larger, and the mounting ability thereof onto the vehicle becomes lower and as well the cost thereof becomes higher. Thus, it is preferable to restrain the capacity of the second chamber 29 to about $\frac{10}{1,400}$ of the capacity of the fuel tank.

The activated carbon serving as the adsorbent is classified, as seen in FIG. 3, into pulverized coal distributed in a granular size range from 0.7 to 2.0 mm and granulated coal distributed in a granular size range from 2.0 to 2.5 mm. Although the air-flow resistance of the canister becomes low as shown in FIG. 4 if the granulated coal having a large granular size is used as all activated carbon, that is, the activated carbon 30 in the second chamber, the activated carbon 13 in the main adsorbent chamber 12 and the activated carbon 19, 20 in the first and second subchambers 17, 18, the working capacity becomes small as shown in FIG. 5.

Figure 4:
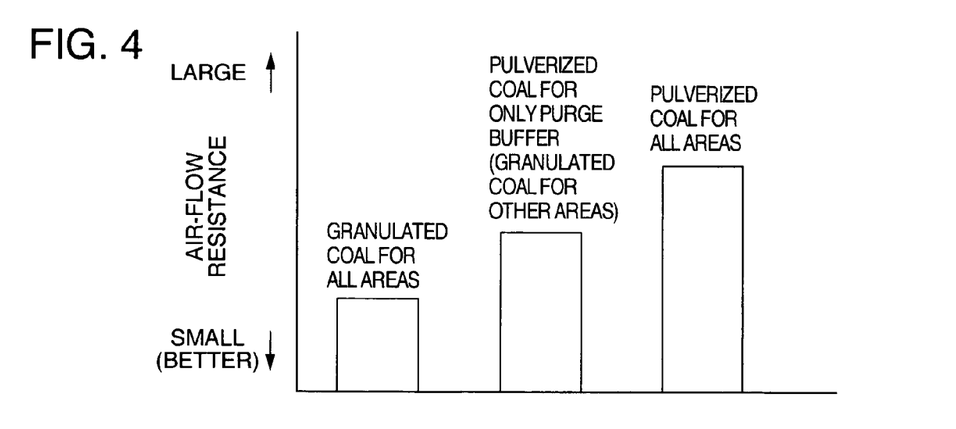
FIG. 4 is a view for explaining a relationship between activated carbon to be used and an air-flow resistance.
Figure 5:
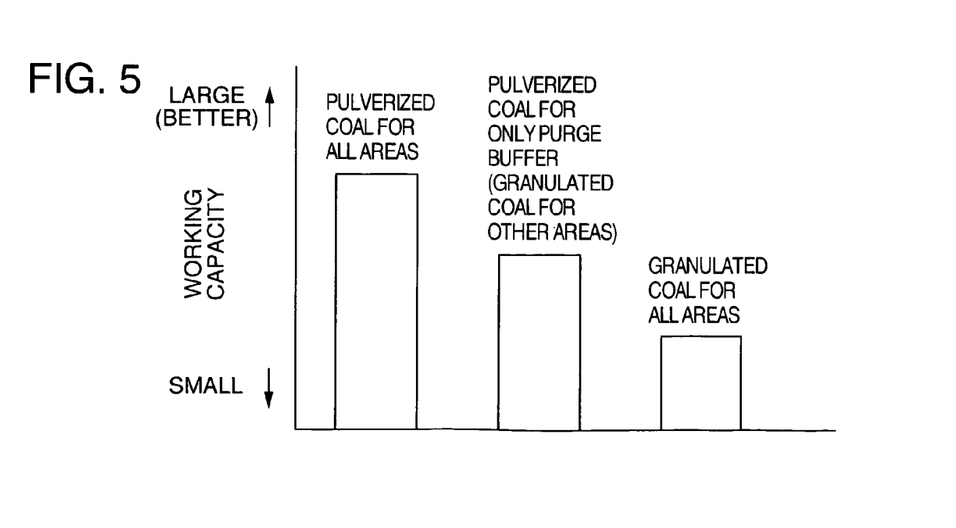
FIG. 5 is a view for explaining activated carbon to be used and a working capacity.

On the contrary, if the pulverized coal having a small granular size is used as all activated carbon, the air-flow resistance of the canister becomes higher as shown in FIG. 4, but the working capacity becomes larger (better) as shown in FIG. 5.

Thus, when the pulverized coal having a small granular size is used as the activated carbon in the second chamber 29, and granulated coal having a large granulated size is used as the activated carbon 13, 19, 20 in the other chambers, the absorption of the activated carbon in the second chamber 29 is increased so as to further decrease the time variation in fuel concentration of the purged gas and to restrain abrupt variation in engine air-fuel ratio, thereby carrying out satisfactory engine operation.

The air-flow resistance of the activated carbon in the other chamber can be decreased by using the granulated coal having a large granular size, and accordingly, the evaporated gas which flows into the canister from the tank port during fueling can be adsorbed to the activated carbon in the main adsorbent chamber 12 and the subchambers 17, 18 without substantially increasing the overall air-flow resistance of the canister. Thereby, it is possible to obtain good fuel supply performance and good adsorption performance with each other during fueling.

Embodiment 2

Figure 6:
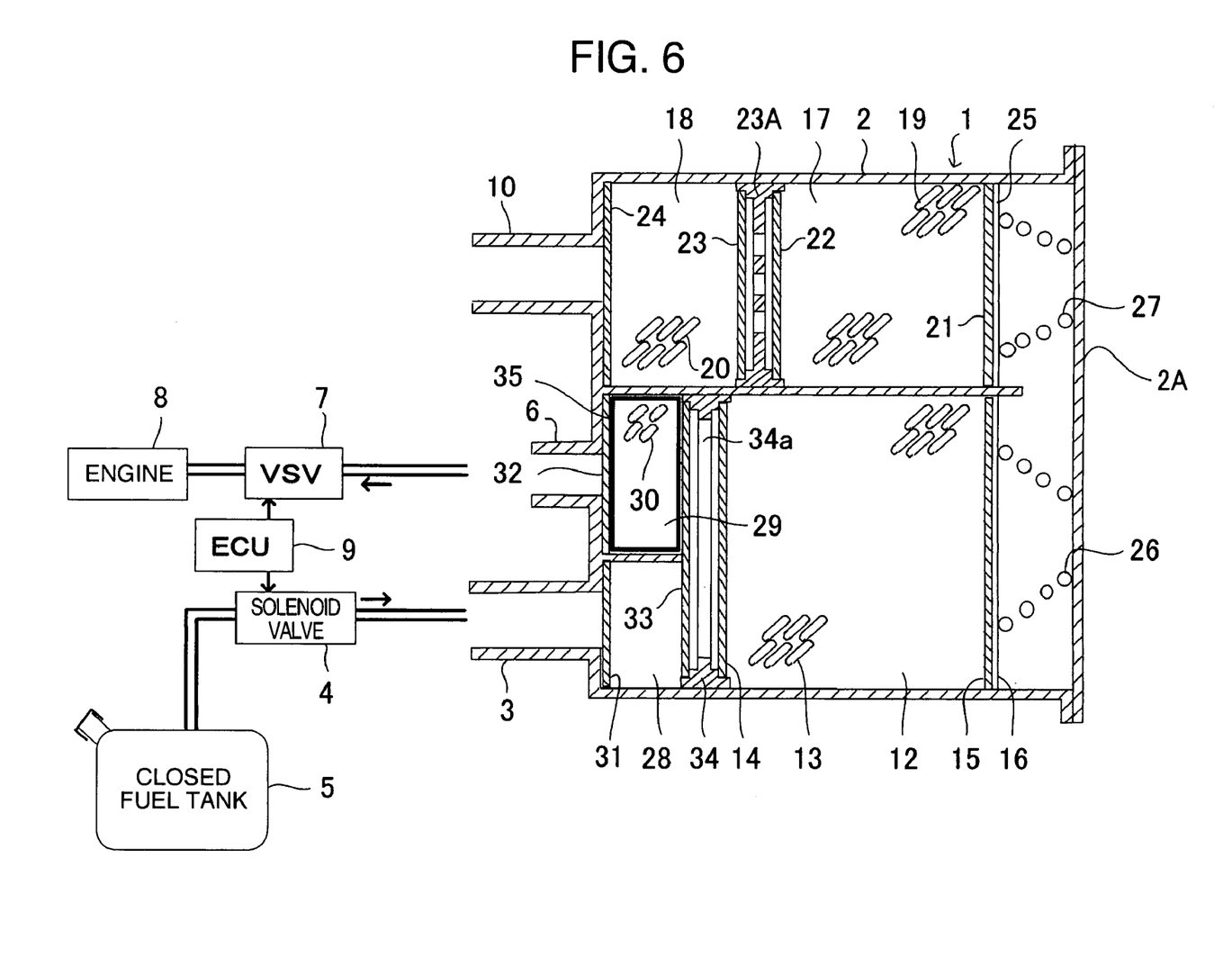
FIG. 6 is a view illustrating an overall configuration of an evaporated fuel treating equipment in an embodiment 2 according to the present invention, in which a canister is shown in a vertical sectional view.

Referring to FIG. 6 which shows an embodiment 2 according to the invention, this embodiment has the same configuration as that of the embodiment 1, except that the activated carbon 30 contained in the second chamber 29 is packed by a filter member 35 wrapping it while the activated carbon 13, 19, 20 are not packed. In order to assembly the packed activated carbon 30 wrapped with the filter member 35 as shown in FIG. 6, the casing 2 is configured such that a cover 2A is finally secured by welding to the right side of the casing 2 as viewed in the figure.

In this embodiment 2, the same reference numerals are used to denote parts having the same functions as that of those in the embodiment 1 so as to abbreviate the explanation thereof. Further, the arrows showing the flow of the evaporated gas and the like are similar to those of the embodiment 1, and accordingly, which are not shown for the brevity of the figure.

Embodiment 3

Figure 7:
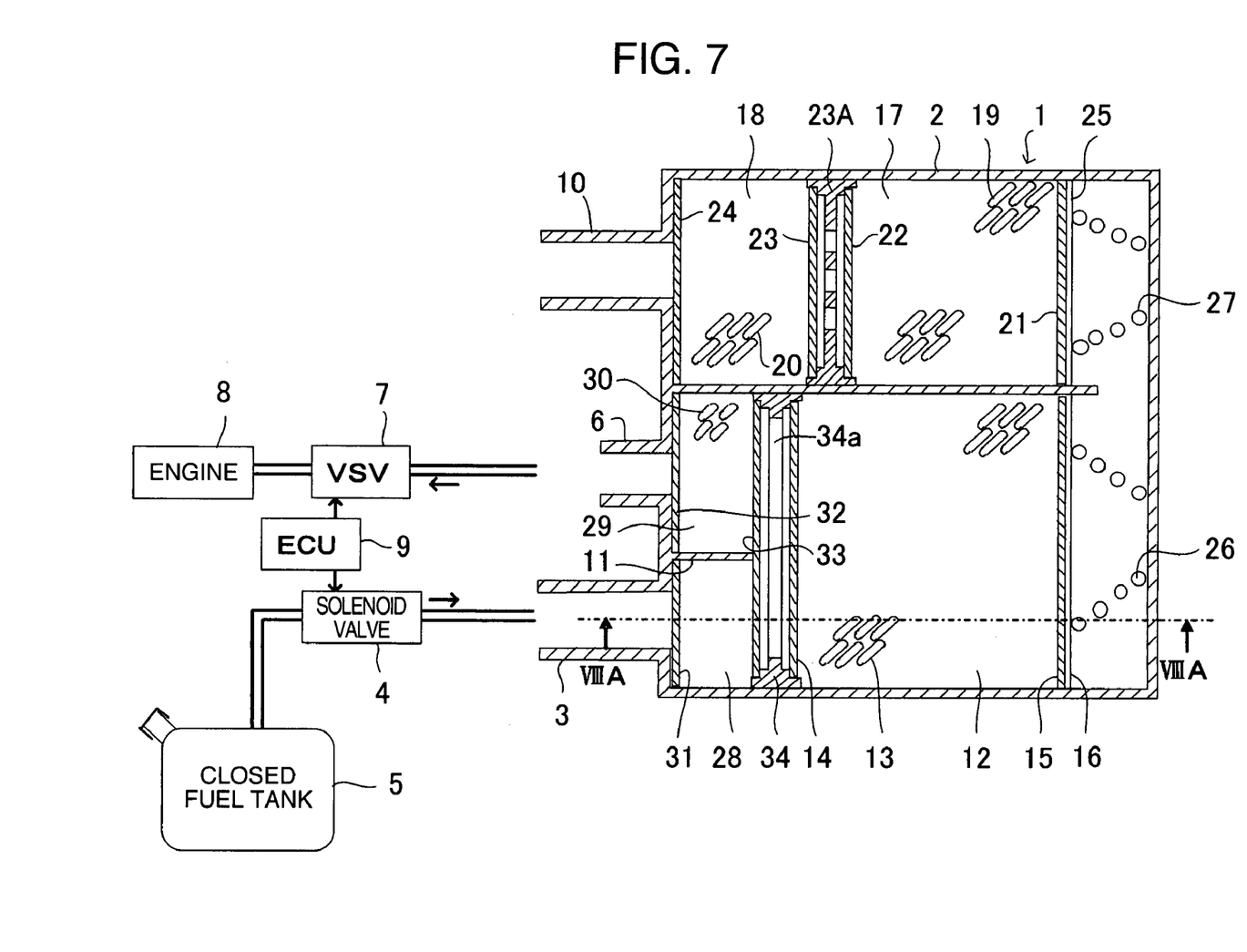
FIG. 7 is a view illustrating an overall configuration of an evaporated fuel treating equipment in an embodiment 3 according to the present invention, in which a canister is shown in a vertical sectional view.
Figure 8A:
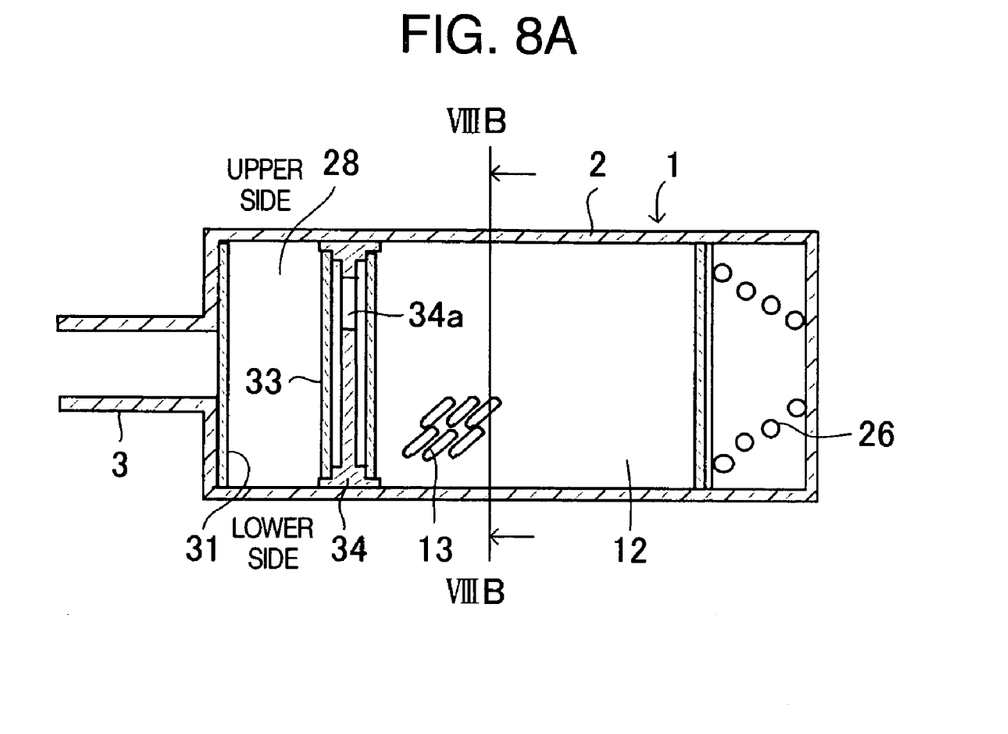
FIG. 8A is a sectional view along line VIIIA—VIIIA in FIG. 7.
Figure 8B:
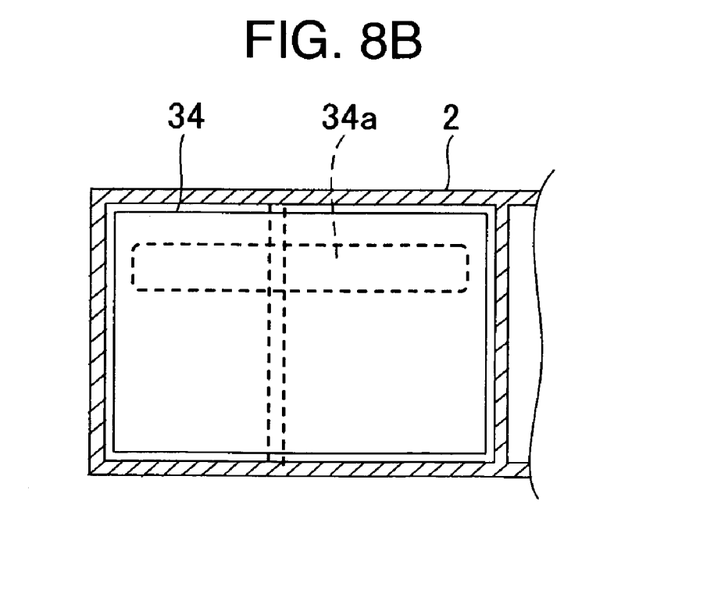
FIG. 8B is a sectional view along line VIIIB—VIIIB in FIG. 8A.

Referring to FIGS. 7, 8A and 8B which show an embodiment 3 of the invention, the configuration of the embodiment 3 is the same as that of the embodiment 1, except that the shape of the purge buffer plate 34, in particular, the shape of the passage 34a, is different from that of the embodiment 1. Thus, the same reference numerals are used to denote the same parts as those in the embodiment 1 in order to abbreviate the explanation thereto.

In this embodiment 3, the passage 34a communicating between the first chamber 28 and the second chamber 29 is located on the upper side of the purge buffer plate 34 in the posture the canister 1 installed in the vehicle, and accordingly, the evaporated gas (vapor) having flown into the first chamber 28 from the tank port 3 can hardly flow into the main adsorbent chamber 12 but can smoothly flow into the second chamber 29.

Embodiment 4

Referring to FIGS. 9 to 14 which show a specific configuration of a canister in an embodiment 4 according to the invention, the same references are used to denote parts having the same functions as those in the embodiment 1 so as to abbreviate the explanation thereto. It is noted that the same reference numerals are used to denote parts having the same functions as those in the embodiments 1 to 3 although the shapes of elements in the embodiment 4 are different in details in comparison with the embodiments 1 to 3 which schematically indicate the overall configuration thereof.

Figure 9:
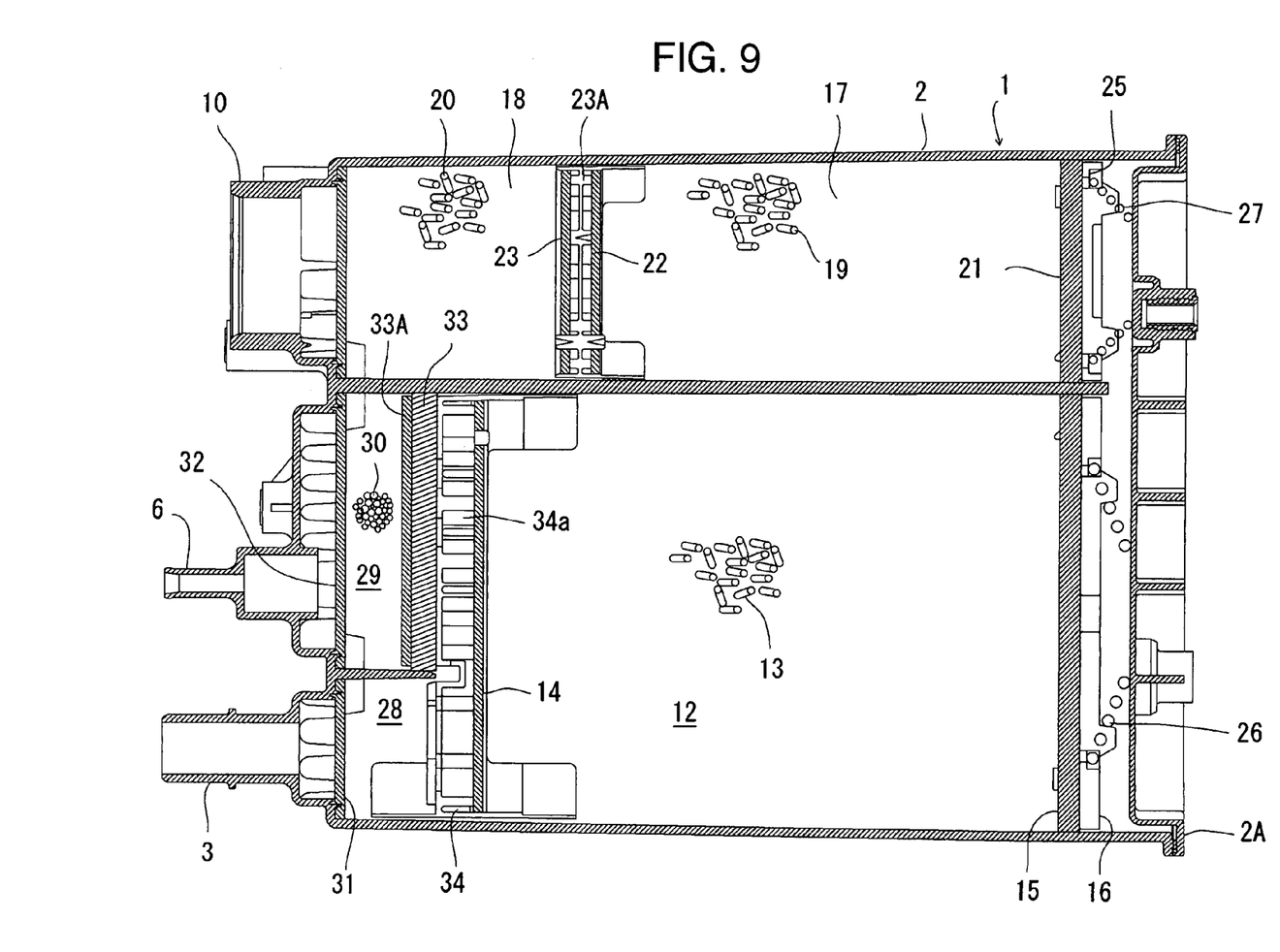
FIG. 9 is a vertical sectional view illustrating a canister in an embodiment 4 according to the present invention.
Figure 10A:
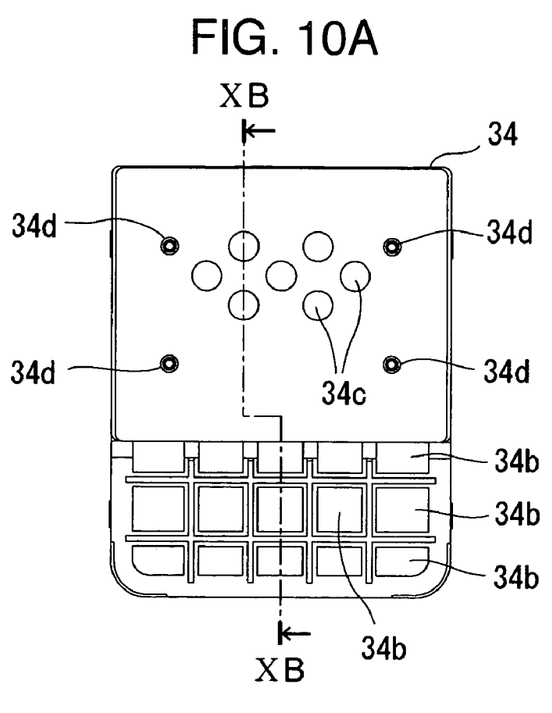
FIG. 10A is a view as viewed from the left side of FIG. 9.
Figure 10B:
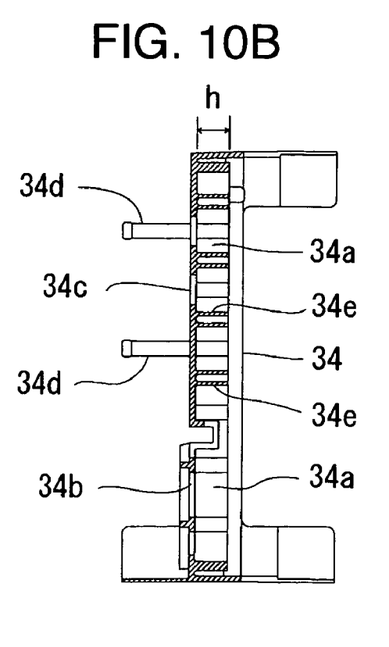
FIG. 10B is a sectional view illustrating along line XB—XB in FIG. 10A.
Figure 10C:
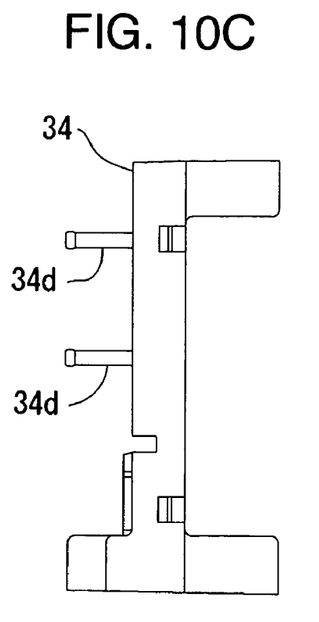
FIG. 10C is view as viewed from the right side of FIG. 10A.
Figure 10D:
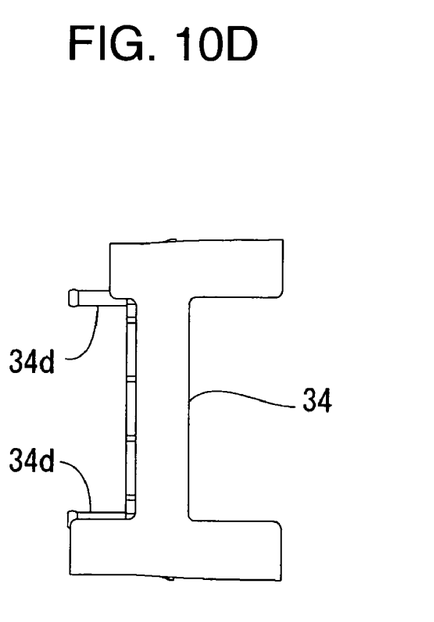
FIG. 10D is a view as viewed from the bottom side of FIG. 10C.
Figure 11:
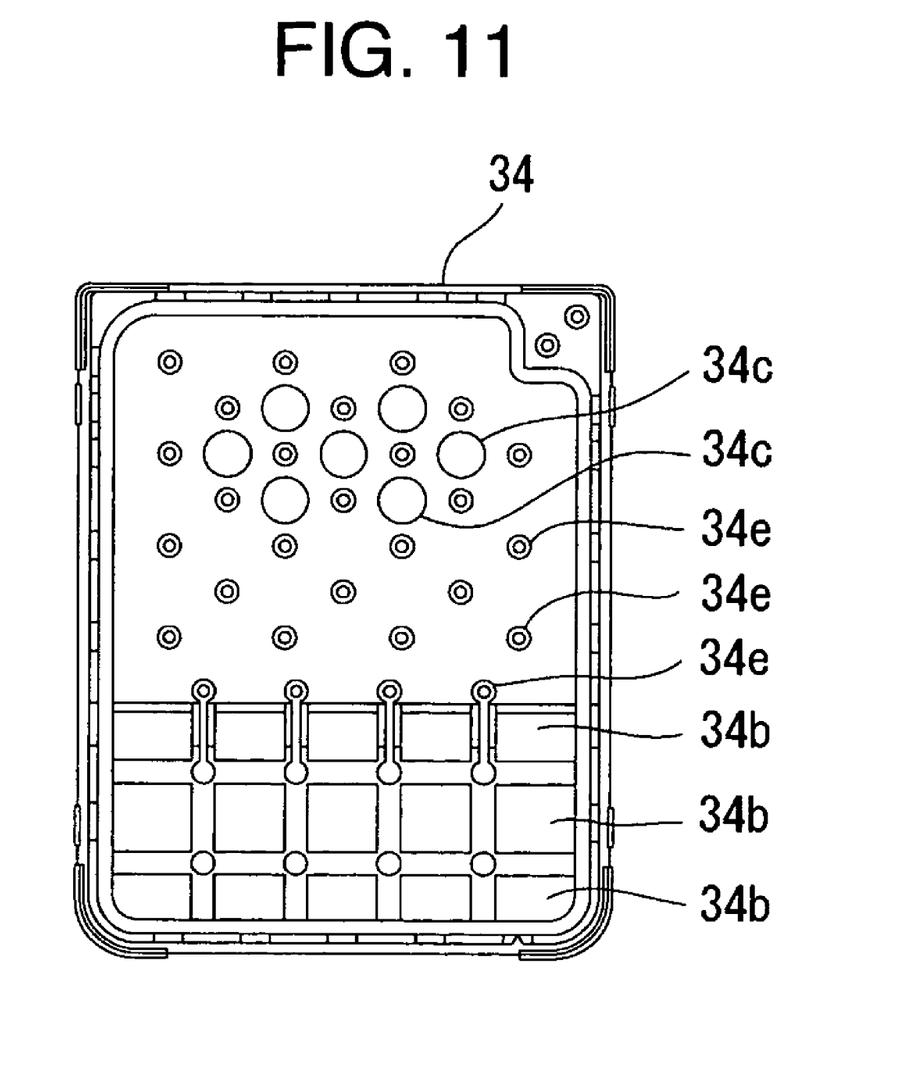
FIG. 11 is a view illustrating a purge buffer plate in the canister shown in FIG. 9, as viewed from the right side of FIG. 9.

In this embodiment 4, the purge buffer plate 34 is also located between the filters 14 and 33, and comprises a passage 34a communicating between the first chamber 28 and the second chamber 29. This buffer plate 34 incorporates twenty eight pieces of retaining pins 34e having a height h as shown in FIGS. 10B and 1. These retaining pins 34e are adapted to retain the filter 14 as shown in FIG. 9. Further, the passage 34a in the buffer plate 34 is formed therein with fifteen rectangular openings 34b opened to the first chamber 28 and with seven circular openings 34c opened to the second chamber 29. Moreover, four positioning pins 34d for holding the filter 33 are projected from one of surfaces of the buffer plate 34.

It is noted that there is shown, in FIG. 9, a member 33A which is a filter superposed on one of the surfaces of the filter 33 (on the second chamber 29 side), and having an air-flow resistance set to be higher than that of the filter 33, and which has such a function that the vapor can be smoothly diffused through in the filter 33 upon flowing thereof.

Figure 12:
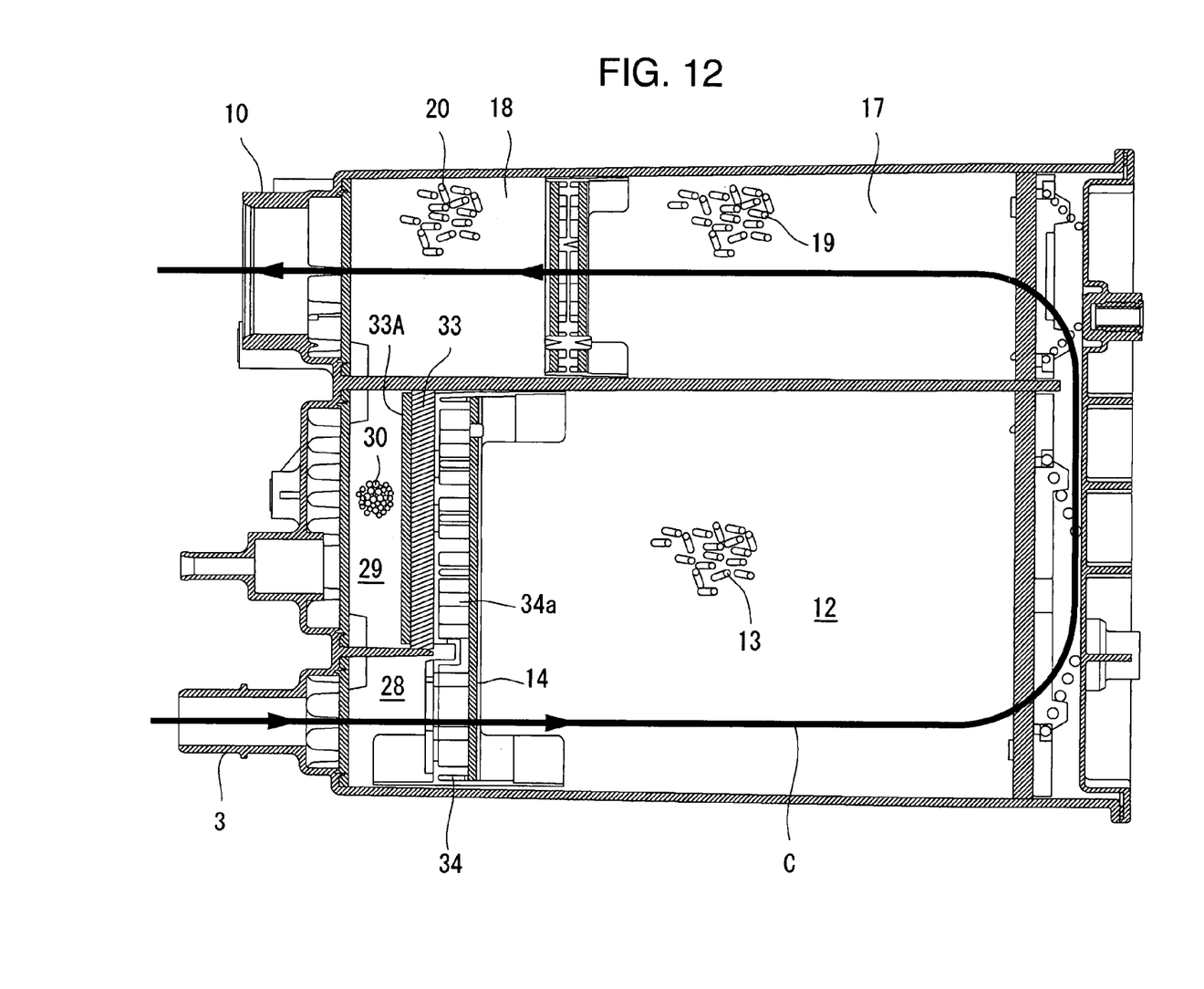
FIG. 12 is a vertical sectional view for explaining a flow of evaporated gas (vapor) in the embodiment 4 of the present invention.
Figure 13:
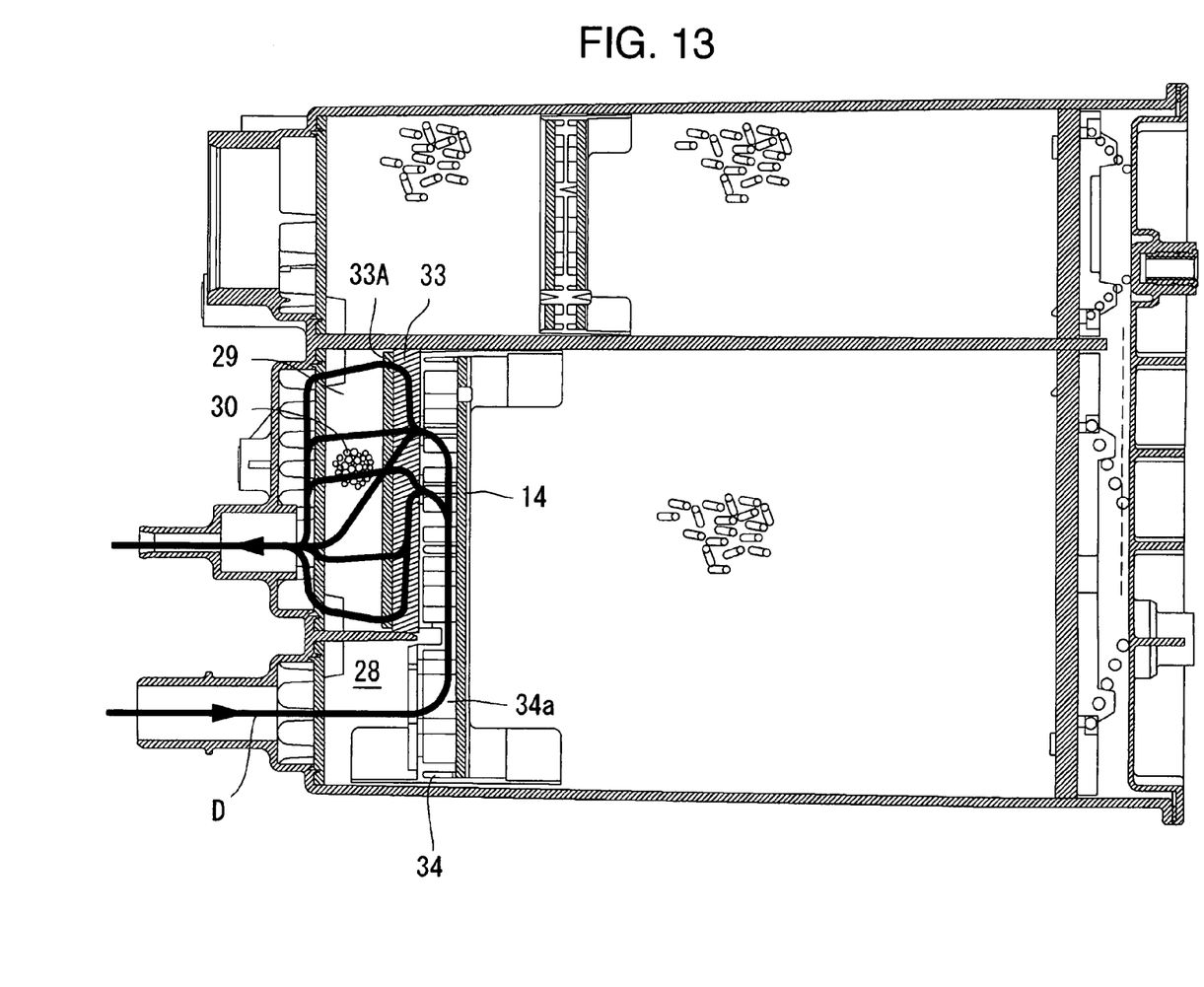
FIG. 13 is a vertical sectional view for explaining a flow of evaporated gas in the embodiment 4 of the present invention.
Figure 14:
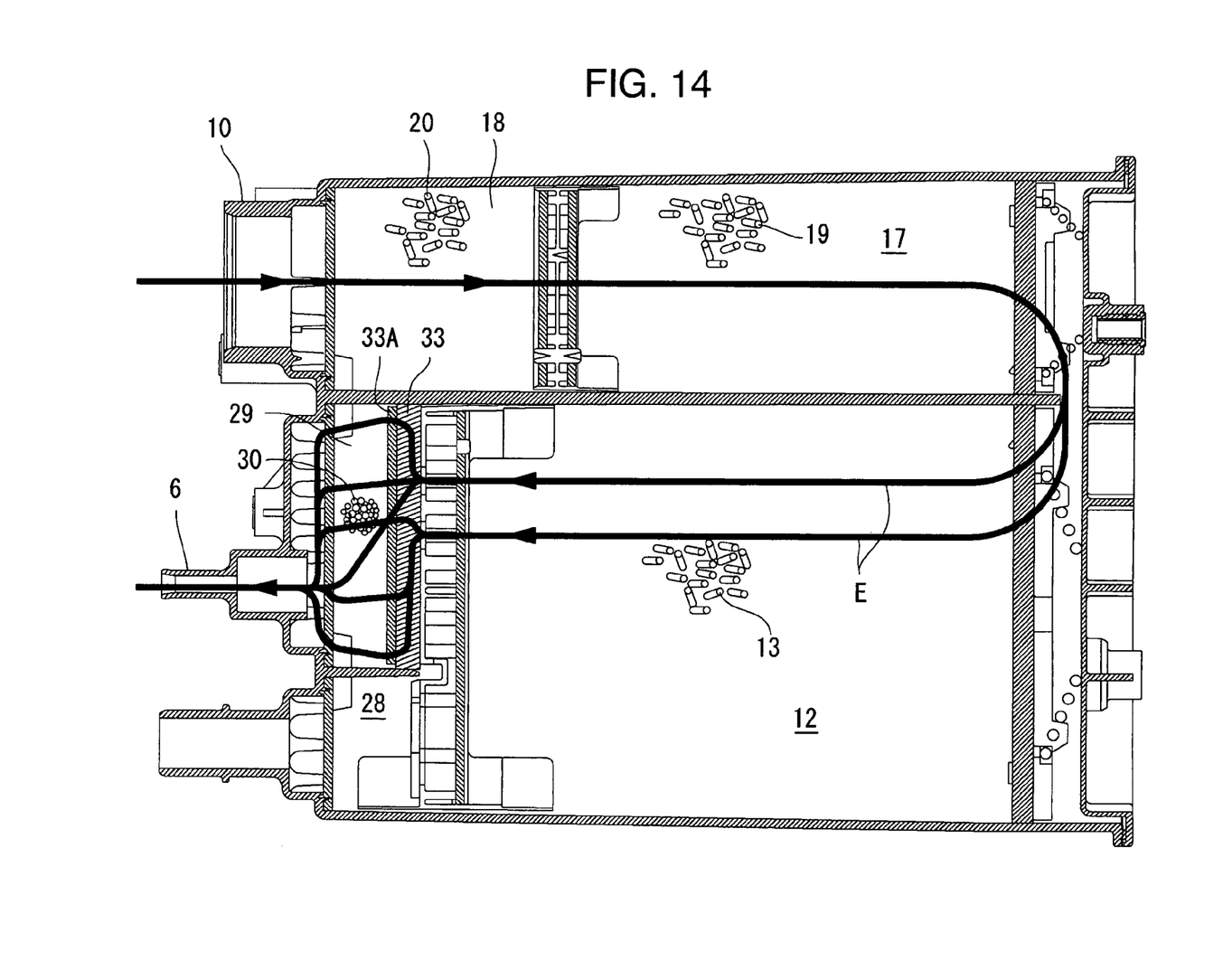
FIG. 14 is a vertical sectional view illustrating the flow during purge in the embodiment 4 of the present invention.

FIGS. 12, 13 and 14 show the arrows C, D and E indicating flows of evaporated gas (vapor) in FIG. 9, corresponding respectively to the flows C, D and E shown in FIG. 1. In FIGS. 13 and 14, it can be understood that the evaporated gas is diffused widely in the filter 33 under the action of the filter 33A, and accordingly, it can be uniformly spread over the activated carbon 30 in the second chamber 29. Thus, the adsorption and purge of the vapor to and from the activated carbon 30 can be effectively carried out. It is further noted that only reference numbers of the components associated with the explanation of the vapor flows with the arrows C, D, E are described in FIGS. 12 to 14, and the reference numerals of the components which are not substantially associated with this explanation are not describe therein in order to avoid complication of the figures.

This embodiment 5 is directed to the fourth and tenth aspects of the invention. In FIGS. 7, 8A and 8B, the air-flow resistance of the filter 14 provided in the main adsorbent chamber 12 on the tank port 3/purge port 6 side is set per unit area to be higher than that of the filter 32 in the second chamber 29 on the purge port 6 side and of the filter 33 provided in the second chamber 29 on the main adsorbent chamber 12 side.

During fueling, although air containing a large quantity of fuel vapor generated in the fuel tank flows into the canister from the tank port, the air can be smoothly discharged from the atmospheric port with little affection by a pressure loss through the filter 14 because of the high flow rate of the air. Thus, during fueling, no automatic stop of fuel at a fuel supply nozzle would occur until the fuel is supplied up to a predetermined quantity.

Since the flow rate is controlled by opening and closing the solenoid valve during running of the vehicle, although no large quantity of fuel vapor flows into the canister through the tank port, the fuel vapor is surely led into the purge line (or the intake passage of the engine) from the filter 33 since the air-flow resistance of the filter 14 is set to be higher, thereby it is possible to prevent the fuel vapor from being adsorbed to the activated carbon 13 in the main adsorbent chamber 12. It is noted that a relatively high effect in which the fuel vapor surely flows into the purge line from the fuel tank so as to prevent the fuel vapor from being adsorbed to the activated carbon in the main adsorbent chamber 12, can be obtained by setting the air-flow resistance of the filter 14 to be higher than that of the filter 33.

Embodiment 6

Figure 15:
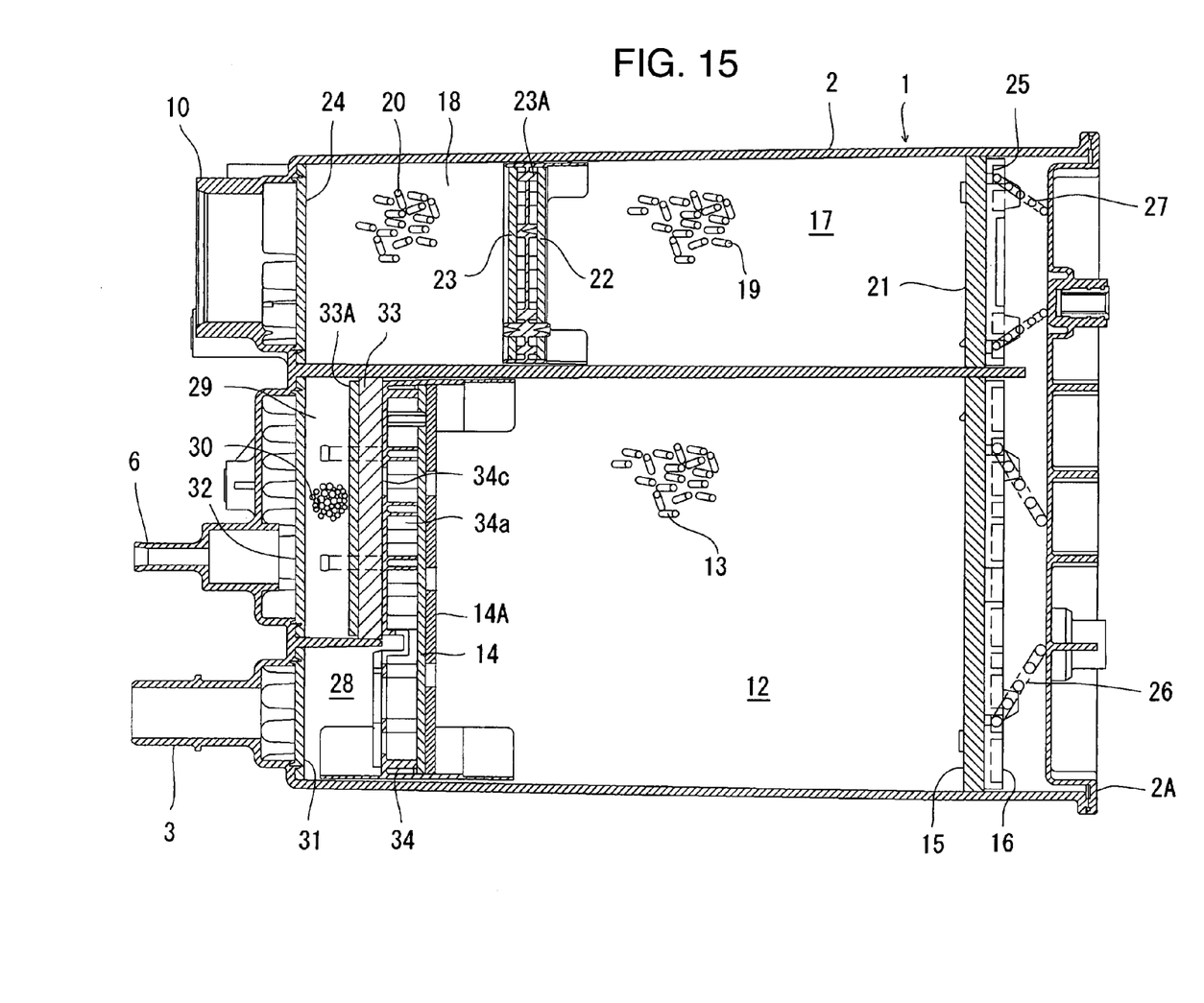
FIG. 15 is a vertical sectional view illustrating a canister in an embodiment 6 according to the present invention.
Figure 16A:
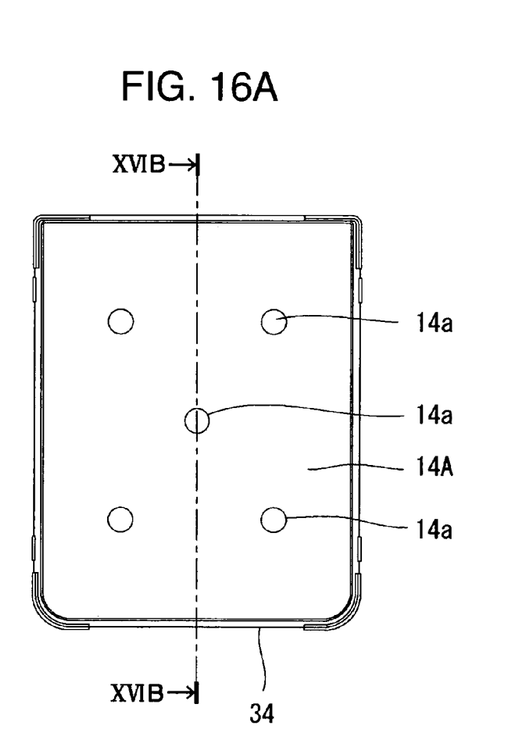
FIG. 16A illustrates the subassembly as viewed from the right side of FIG. 15.
Figure 16B:
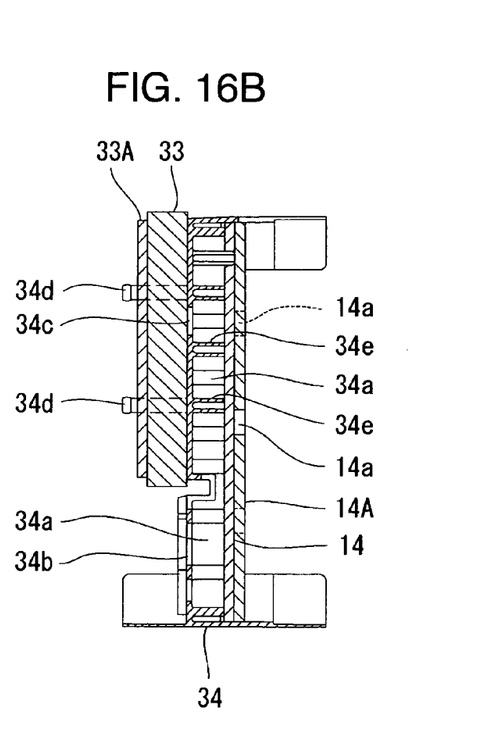
FIG. 16B is a sectional view along line XVIB—XVIB in FIG. 16A.

Referring to FIGS. 15, 16A and 16B which show an embodiment 6 according to the invention, the configuration of the embodiment 6 is the same as that of the embodiment 4 shown in FIGS. 9 to 14, except that an adsorbent retaining plate 14A is additionally incorporated. Referring to FIG. 15, the adsorbent retaining plate 14A is superposed with the filter 14 on the right side of FIG. 15, and is formed therein with five constriction holes 14a. The total air-flow resistance of the filter 14 and the adsorbent retaining plate 14a which are superposed with each other is set per unit area to be higher than that of the filter 32 provided in the second chamber 29 on the purge port 6 side and of the filter 33, 33A provided in the second chamber 29 on the main adsorbent chamber 12 side.

Incidentally, in FIG. 15, instead of superposing the adsorbent retaining plate 14A with the filter 14 on the right side thereof in the drawing, the adsorbent retaining plate may be superposed with the filter on the left side thereof in the drawing. Further, there may be provided one or more of the constriction holes.

It is noted that the same reference numerals in the embodiment 6 shown in FIGS. 15, 16A and 16B are used to denote parts having the same functions as that in the embodiment 4 shown in FIGS. 9 to 14.

As stated above, the present invention can be used in an evaporated fuel treating equipment for an internal combustion engine using a closed fuel tank.

The invention claimed is:

1. A canister comprising a tank port communicated with an upper air chamber in a fuel tank, a purge port communicated with an intake passage of an engine, an atmospheric port opened to atmosphere, and a main adsorbent chamber containing activated carbon for adsorbing evaporated fuel flowing from said tank port to said atmospheric port, wherein a partition plate is provided between said tank port and said purge port for preventing both ports from being directly communicated with each other, a first chamber is provided between said main adsorbent chamber and said tank port, a second chamber is provided between said main adsorbent chamber and said purge port, and a purge buffer plate is provided in said main adsorbent chamber on a side of said tank port/purge port, for communicating said first and second chambers with each other, and wherein said first chamber serves as an air chamber containing no activated carbon and said second chamber contains activated carbon.

2. A canister as set forth in claim 1, wherein an air-flow resistance between said first chamber and said main adsorbent chamber is set to be higher than that of said purge buffer plate between said fist and second chambers.

3. A canister as set forth in claim 1, wherein pulverized coal is used as the activated carbon contained in said second chamber, and granulated coal is used as the activated carbon contained in other adsorbent chambers.

4. A canister as set forth in claim 1, wherein an air-flow resistance of a filter provided in said main adsorbent chamber on a side of said tank port/purge ports is set per unit area to be higher than that of a filter provided in the second chamber on a side of said purge port and of a filter provided in said second chamber on a side of said main adsorbent chamber.

5. A canister as set forth in claim 1, wherein an adsorbent retaining plate is superposed on one side of a filter provided in said main adsorbent chamber on a side of the tank port/purge ports, and said adsorbent retaining plate is provided with at least one constriction hole, and a total air-flow resistance of said filter and said adsorbent retaining plate superposed with each other is set per unit area to be higher than that of a filter provided in said second chamber on a side of said purge port and of a filter provided in said second chamber on a side of said main adsorbent chamber.

6. A canister as set forth in claim 1, wherein said activated carbon contained in said second chamber is packed by a filter member wrapping it, but said activated carbon in other adsorbent chambers is not packed.

7. A canister as set forth in claim 1, wherein said second chamber containing the activated carbon has a capacity which is in a range of $1/1,400$ to $10/1,400$ with respect to a capacity of the fuel tank.

8. A canister as set forth in claim 1, wherein a vapor passage formed in said purge buffer plate is located on an upper side in said buffer plate in such a posture that said canister is installed in a vehicle.

9. A canister as set forth in claim 2, wherein pulverized coal is used as the activated carbon contained in said second chamber, and granulated coal is used as the activated carbon contained in other adsorbent chambers.

10. A canister as set forth in claim 9, wherein an air-flow resistance of a filter provided in said main adsorbent chamber on a side of said tank port/purge ports is set per unit area to be higher than that of a filter provided in the second chamber on a side of said purge port and of a filter provided in said second chamber on a side of said main adsorbent chamber.

11. A canister as set forth in claim 10, wherein an adsorbent retaining plate is superposed on one side of a filter provided in said main adsorbent chamber on a side of the tank port/purge ports, and said adsorbent retaining plate is provided with at least one constriction hole, and a total air-flow resistance of said filter and said adsorbent retaining plate superposed with each other is set per unit area to be higher than that of a filter provided in said second chamber on a side of said purge port and of a filter provided in said second chamber on a side of said main adsorbent chamber.

12. A canister as set forth in claim 11, wherein said activated carbon contained in said second chamber is packed by a filter member wrapping it, but said activated carbon in other adsorbent chambers is not packed.

13. A canister as set forth in claim 12, wherein said second chamber containing the activated carbon has a capacity which is in a range of $1/1,400$ to $10/1,400$ with respect to a capacity of the fuel tank.

14. A canister as set forth in claim 13, wherein a vapor passage formed in said purge buffer plate is located on an upper side in said buffer plate in such a posture that said canister is installed in a vehicle.

* * * * *